Figure 1:
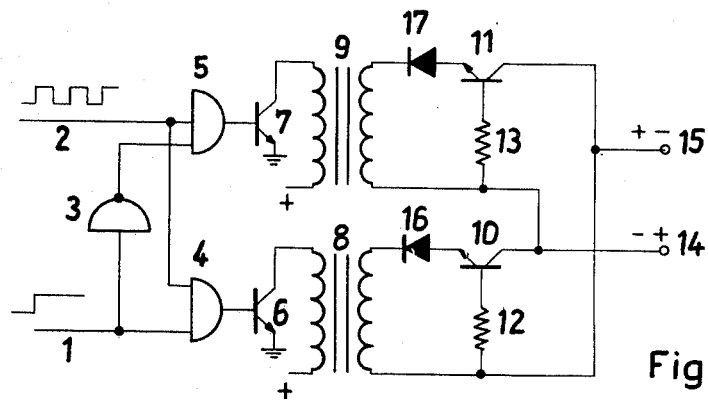

United States Patent

[11] 3,581,112

[72] Inventor Peter Laderach
 Worb, Switzerland
[21] Appl. No. 795,491
[22] Filed Jan. 31, 1969
[45] Patented May 25, 1971
[73] Assignee Hasler AG
 Berne, Switzerland
[32] Priority Feb. 5, 1968
[33] Switzerland
[31] 1643/68

[54] ELECTRONIC RELAY
 5 Claims, 3 Drawing Figs.
[52] U.S. Cl.................................................. 307/241,
 307/218, 307/254
[51] Int. Cl...................................................... H03k 17/00
[50] Field of Search............................................ 307/253,
 314, 321, 318, 218

[56] References Cited
UNITED STATES PATENTS
3,022,454 2/1962 Millis........................... 307/254(X)
3,041,475 6/1962 Fisher, Jr....................... 307/253(X)
3,505,540 4/1970 Ferrari......................... 307/314(X)
FOREIGN PATENTS
6,601,565 2/1966 Netherlands................. 307/318

Primary Examiner—Donald D. Forrer
Assistant Examiner—B. P. Davis
Attorney—Brady, O'Boyle & Gates ABSTRACT: An electronic relay with one input for the reception of one binary signal, with means for applying an alternating voltage or a pulse voltage, having a frequency which is high relative to the keying frequency, to one of two transformer primaries on at least one transformer having at least one transformer secondary which is DC isolated from the aforementioned input and from the supply voltage sources, with means for rectifying the alternating voltage signal and with one output for delivering a DC voltage whose polarity depends on the state of the input signal, the connections between the transformer secondary and the relay output being provided via the emitter-collector connections of two transistors, which are driven by currents derived from the transformer secondary and applied to the base.

PATENTED MAY25 1971 3,581,112

Inventor:
PETER LÄDERACH
BY Brady, O'Boyle & Gates
ATTORNEYS

ELECTRONIC RELAY

The invention relates to an electronic relay, used in particular as a telegraph output relay. The relay is provided with an input for the reception of binary signals and an output for delivering a DC voltage whose polarity depends on the state of the binary input signal. The output is DC isolated by a transformer from the input and from the supply voltage sources.

The prior art discloses relays of the kind heretofore described in which, depending on the state of the binary input signal, an alternating or pulse voltage, whose frequency is large relative to the keying frequency, is applied to the primary winding of one of two transformers. The outputs of the rectifiers connected to the secondary winding of each transformer are connected either in antiparallel or in series opposition. However, in a parallel circuit the diodes of the nonenergized rectifier circuits represent a short circuit for the voltage of the other rectifier while in a series circuit they block the passage of the current of the other rectifier. In order to nevertheless permit interconnection of the two rectifier outputs, the outputs of the two rectifiers in known systems are in each case bridged with resistors in which the greater part of the power delivered by the transformer is dissipated as loss while only a small part remains as effective output.

The invention eliminates the disadvantage of the known circuits by providing the connections between the transformer secondary and the relay output via the emitter-collector connection of two transistors which are driven by currents derived from the transformer secondary voltages and applied to the base.

Figure 2:
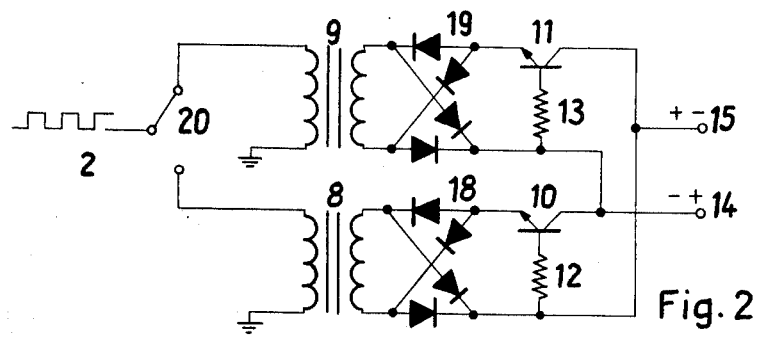
Figure 3:
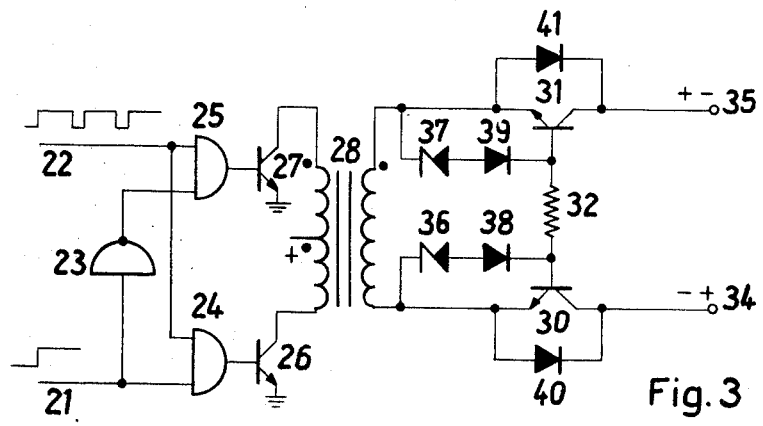

An exemplified embodiment of the invention is described hereinbelow by reference to illustrations in which:

FIG. 1 is an electronic relay with two transformers,
FIG. 2 is a modification of the circuit of FIG. 1,
FIG. 3 is an electronic relay with one transformer.

In FIG. 1, the numeral 1 is the relay input on which the binary input signal is received, where said binary signal may be either 0, for example earth potential, or 1, for example a positive potential. This signal is applied to the inputs of two AND gates 4 and 5, namely, directly to the AND gate 4 but via the inverter 3 to the AND gate 5. The numeral 2 refers to an auxiliary input to which a balanced square-wave voltage is applied, said voltage being supplied directly to the two AND gates 4 and 5. The frequency of the aforementioned voltage is high relative to the keying frequency. The outputs of the AND gates each drive one transistor 6 or 7 respectively, the primary of a transformer 8 or 9 respectively being connected into the collector circuit of the aforementioned transistors. The secondary of the transformer 8 together with a resistor 12 is connected in the base-emitter connection of a transistor 10, the secondary of the transformer 9 together with a resistor 13 being connected into the base-emitter connection of a transistor 11. The collectors of the two transistors are connected to one output each of the relay and to that base resistor terminal of the other transistor which is distal relative to the base. A diode 16 or 17 respectively is connected in the emitter conductor of the transistor 10 or 11 respectively; however, said diode may also be connected into the collector conductor.

The input signal at position 1 may be assumed to be 1; the AND gate 5 will then be nonconductive and the AND gate 4 will be conductive. A square-wave voltage, which periodically renders the transistor 6 conductive and nonconductive, will appear at the output of the aforementioned AND gate 4. A square-wave voltage will therefore appear across the transformer 8 while the transformer 9 is dead. When the lower end of the secondary of the transformer 8 is positive with respect to the upper end, a current will flow in the base-emitter diode of the transistor 10 to render same conductive so that a current flows from the lower end of the secondary of the transformer 8 to the relay output terminal 15 via the load resistor, not shown, to the terminal 14, to the collector and to the emitter of the transistor 10 and via the diode 16 back to the upper end of the secondary of the transformer 8. Only the collector-emitter connection of the transistor 10 will be in the circuit while only the base current of the aforementioned transistor is dissipated as current loss. With the polarity as described hereinabove the collector of the transistor 11 will be positive with respect to its base so that said transistor is driven to cut off. Known circuits for filtering and voltage stabilization may be connected to the output terminals 14 and 15.

If the polarity of the voltage on the transformer 8 reverses, the output voltage of the transformer will be connected to the base-emitter diode of the transistor in the reverse direction. If the load is capacitive, its voltage is applied in the forward direction to the base-collector diode and a low current, determined by the magnitude of the voltage and by the resistor 12, will flow. Accordingly, the transistor is operated in the inverse direction and an increased discharge current would flow via the collector and emitter unless prevented from so doing by the diode 16.

The same effect is achieved if the aforementioned diode is connected into the collector conductor instead of into the emitter conductor.

No current flows in the relay output circuit during the reverse half-cycle and half-wave rectification therefore takes place. Corresponding conditions are obtained if the transformer 9 is energized but the polarity of the voltage at the output 14, 15 is reversed. The diodes in the emitter and/or collector conductor of the transistors can function as protective diodes in addition to acting as described hereinabove, in the event of the reverse voltages which occur under these conditions being too high for the transistors.

While the polarity of the transformer in the circuit of FIG. 1 is so connected that the transistors 6 and 10 or 7 and 11 respectively conduct alternately (push-pull transformer), FIG. 2 by contrast shows a system for full-wave rectification. Reversal between transformers 8 and 9 is merely diagrammatically indicated by the changeover switch 20 which is driven by the input signal. One rectifier circuit 18 or 19, for example one full-wave rectifier each, is connected to the secondaries of the transformers 8 and 9 while said rectifier circuit has connected to it the transistors 10 and 11, the base resistors 12 and 13 and the outputs 14 and 15. Apart from rectification by means of the rectifier circuits 16 and 17, the method of operation is the same as that relating to the circuit according to FIG. 1.

In FIG. 3, the circuit on the transformer primary is constructed in similar manner to that shown in FIG. 1, the circuit elements with the reference numerals 21 to 28 corresponding to the circuit elements 1 to 8 of FIG. 1 with two exceptions: the auxiliary voltage at the input 22 is an unbalanced square-wave voltage, the proportion of state 1 in one cycle being substantially larger than the proportion of state 0. Furthermore, the collectors of both transistors 26 and 27 are connected to the primary of a single transformer 28 whose center tapping is connected to one terminal of the supply voltage.

The emitter of one of the transistors 30 and 31 is connected with each end of the secondary of the transformer 28, while the collectors are connected directly to the relay output terminals 34 or 35 respectively. The collector-emitter connection of both transistors 30, 31 are each bridged by a diode 40, 41 whose forward direction is opposite to the forward direction of the transistor.

The bases of the two transistors 30 and 31 are joined via the resistor 32. The serial connection of a Zener diode 36 or 37 respectively and a diode 38 or 39 respectively is connected in parallel to the emitter connection of each of the two transistors so that the forward direction of the Zener diode is in phase with the corresponding base emitter diode while that of the diode is opposite to the corresponding base emitter diode.

Since the voltage time integral on the secondary of the transformer must be equal to zero for a prolonged period, each cycle of the auxiliary voltage is accompanied by a voltage pulse of longer duration but smaller amplitude in one direction and a voltage pulse of shorter duration but higher amplitude in the opposite direction. Relative to the breakdown voltage of the Zener diode, the secondary voltage is so selected as to rise above the breakdown voltage of the Zener diodes during polarity periods of short duration while said breakdown voltage is not reached during polarity periods of longer duration.

For example, if the input signal at position 21 is equal to 1, the AND gate 25 will be nonconductive and the AND gate 24 will be conductive during the longer portion of each cycle. During this period of time a current will flow through the transistor 26 and at the winding poles designated by dots there will be positive voltages which do not produce any current in the secondary circuit since the base-emitter connection of the transistor 31 and the Zener diode 37 are stressed in the reverse direction and the breakdown voltage of the last-mentioned Zener diodes is not reached. During the shorter part of each cycle the transistor 26 is driven to cut off, a positive voltage is produced at the lower end of the secondary winding and a current flows from this position through the Zener diode 36 since its breakdown voltage is exceeded, and from thence via the diode 38, the resistor 32 into the base-emitter connection of the transistor 31 to the upper end of the secondary coil. The path via the diode 39 is blocked by said diode. The transistor 31 is rendered conductive and a current flows from the lower end of the secondary coil via the diode 40, via the load resistor connected between positions 34 and 35 and the transistor 31 to the upper end of the secondary.

If the input signal at position 21 is equal to zero, the AND gate 25 and the transistor 27 will be conductive during the greater portion of each cycle so that the voltages on the transformer and the voltage at the output will be of reversed polarity.

In a modification of the circuit according to FIG. 3 it is possible to employ transistors whose base-emitter connection has a certain breakdown voltage of such value that said transistors are not destroyed by breakdown provided the current does not exceed a certain value. In such an event it is possible for the Zener diodes, 36, 37 and the diodes 38, 39 to be omitted since the base-emitter connection of the corresponding transistor will take over the function of the aforementioned Zener diodes and diodes. The method of operation is the same as disclosed by reference to FIG. 3.

I claim:

1. An electronic circuit (FIG. 1) for generating a voltage containing a direct current component the polarity of which is controlled by a keying voltage, comprising a first (8) and a second (9) transformer, each having a primary and a secondary winding, an input (1) for a keying voltage, a source of pulsating voltage (2), means (3 to 7) connected and responsive to the keying voltage on said input (1) for applying said pulsating voltage (2) to the primary winding of one of said transformers (8, 9) selected in dependence of the state of the keying voltage on said input (1), a first (14) and a second output terminal (15), a first (16) and a second diode (17), a first transistor (10) having an emitter, a base and a collector, said emitter connected via said first diode (16) to one end of the secondary winding of said first transformer (8) and the collector connected to said first output terminal (14), said first diode (16) having the same polarity as the emitter-base-diode of said first transistor, a second transistor (11) having an emitter, a base and a collector, said emitter connected via said second diode (17) to one end of the secondary winding of said second transformer (9), and the collector connected to said second output terminal (15), said second diode (17) having the same polarity as the emitter-base-diode of said second transistor, a first resistor (12) having one end connected to the base of said first transistor (10) and its other end connected to the other end of the secondary winding of said first transformer (8) and to said second output terminal (15), and a second resistor (13) having one end connected to the base of said second transistor (11) and its other end connected to the other end of the secondary winding of said second transformer (9) and to said first output terminal (14).

2. An electronic circuit for generating a voltage containing a direct current component the polarity of which is controlled by an input keying voltage, comprising a first and a second transformer, each having a primary and a secondary winding, a source of pulsating voltage, means responsive to said input keying voltage for applying the pulsating voltage to the primary winding of one of said transformers selected in dependence of the state of said input keying voltage, a first and a second output terminal, a first and a second diode, a first transistor having an emitter, a base and a collector, said emitter connected to one end of the secondary winding of said first transformer (8), and the collector connected via said first diode to said first output terminal, said first diode having the same polarity as the emitter-base-diode of said first transistor, a second transistor having an emitter, a base and a collector, said emitter connected to one end of the secondary winding of said second transformer, and the collector connected via said second diode to said second output terminal, said second diode having the same polarity as the emitter-base-diode of said second transistor, a first resistor having one end connected to the base of said first transistor and its other end connected to the other end of the secondary winding of said first transformer and to said second output terminal, and a second resistor having one end connected to the base of said second transistor and its other end connected to the other end of the secondary winding of said second transformer and to said first output terminal.

3. An electronic circuit (FIG. 2) for generating a voltage containing a direct current component the polarity of which is controlled by a keying voltage input, comprising a first (8) and a second transformer (9), each having a primary and a secondary winding, a source of pulsating voltage (2), means (2, 20) connected and responsive to said keying voltage input (1) for applying said pulsating voltage to the primary winding of one of said transformers (8, 9) selected in dependence of the state of the keying voltage input (1), a first (14) and a second output terminal (15), a first full-wave rectifier circuit (18) having an alternating current input connected to the secondary winding of said first transformer (8), and two direct current output terminals, a second full-wave rectifier circuit (19) having an alternating current input connected to the secondary winding of said second transformer (9), and two direct current output terminals, a first transistor (10) having an emitter connected to one of said direct current output terminals of said first full-wave rectifier circuit (18), a collector connected to said first output terminal (14), and a base, a second transistor (11) having an emitter connected to one of said direct current output terminals of said second full-wave rectifier circuit (19), a collector connected to said second output terminal (15), and a base, a first resistor (12) having one end connected to the base of said first transistor (10) and its other end connected to the other of said direct current output terminals of said first full-wave rectifier circuit (18) and to said second output terminal (15), and a second resistor (13) having one end connected to the base of said second transistor (11) and its other end connected to the other of said direct current output terminals of said second full-wave rectifier circuit (19) and to said first output terminal (14).

4. An electronic circuit (FIG. 3) for generating a voltage containing a direct current component the polarity of which is controlled by a keying voltage input, comprising, a transformer (28) having one primary winding and one secondary winding, a pulse train source (22), means (23 to 27) connected and responsive to said keying voltage input (21) for applying a pulse train from said source (22) to said primary winding, the pulses of said train being shorter than the pulse spacings and the applied pulse polarity being inversed in dependence on the state of the keying voltage input (21), two output terminals (34, 35), two transistors (30, 31), each having an emitter, a collector and a base, said emitters connected each to one end of said secondary winding, said collectors connected each to one of said output terminals (34, 35), and a resistor (32) connecting the bases of said transistors (30, 31) with each other, two diodes (40, 41) each shunting the emitter-collector path of one of said transistors (30, 31) and having the same polarity as the collector-base diode of the associated transistor, the transformer ratio being so selected that the secondary voltage corresponding to the pulses exceeds the reverse breakdown voltage of the transistor base-emitter diode, but the secondary voltage corresponding to the pulse spacings does not reach the reverse breakdown voltage of the transistor base-emitter diode, and the transistor type being so selected that it is not destroyed by the aforementioned breakdown.

5. An electronic circuit (FIG. 3) for generating a voltage containing a direct current component the polarity of which is controlled by a keying voltage input, comprising a transformer (28) having one primary winding and one secondary winding, a pulse train source (22), means (23 and 27) connected to and responsive to said keying voltage input (21) for applying a pulse train from said source (22) to said primary winding, the pulses of said train being shorter than the pulse spacings and the applied pulse polarity being inversed in dependence on the state of the keying voltage input (21), two output terminals (34, 35), two transistors (30, 31), each having an emitter a collector and a base, said emitters connected each to one end of said secondary winding, said collectors connected each to one of said output terminals (34, 35), a resistor (32) connecting the bases of said transistors (30, 31) with each other, two diodes (40, 41) each shunting the emitter-collector path of one of said transistors (30, 31), and having the same polarity as the collector-base diode of the associated transistor, two serial connections of a Zener diode and a diode (36, 38 and 37, 39 resp.) each shunting the emitter-base diode of one of said transistors (30 or 31 resp.), so that the forward direction of the Zener diode corresponds and the forward direction of the diode is opposed to the forward direction of the emitter-base diode of the associated transistor, the transformer ratio being so selected that the secondary voltage corresponding to the pulses exceeds and the secondary voltage of the pulse spacings does not reach the Zener diode breakdown voltage.